3,400,201
Patented Sept. 3, 1968

3,400,201
FUNGICIDAL COMPOSITION CONTAINING PENTACHLOROPHENOL AND AN ORGANOTIN COMPOUND
Jacques Mocotte, Champagne-au-Mont-d'Or, France, assignor to Progil, Paris, France, a corporation of France
No Drawing. Filed Oct. 23, 1963, Ser. No. 318,182
Claims priority, application France, Oct. 29, 1962, 913,758
6 Claims. (Cl. 424—288)

ABSTRACT OF THE DISCLOSURE

This invention relates to a fungicidal mixture and, more particularly, to a composition containing polychlorophenols such as di-, tri-, tetra-, pentachlorophenols and tin organic derivatives such as oxides, halides, acetate, sulfate, phosphate of triethyl-, propyl-, pentyl-, hexyl-, phenyl-tin.

---

The biological activity of the polychlorophenols, particularly pentachlorophenol, has been known for some time. Although these substances exhibit good fungicidal action, they unfortunately present certain drawbacks at the dosages that are necessary. The most important of the problems lie in their toxicity to warm blooded animals, their tendency to color treated objects yellow, and their lack of solubility in certain desirable solvents. At the same time, it is well known that certain organo-tin compounds make very good fungicides; this is particularly true of the oxide of tributyl-tin, whose great activity permits the use of low dosages. However, the cost of these organo-tin compounds makes them impractical. These and other difficulties experienced with the prior art substances have been obviated in a novel manner by the present invention.

It is, therefore, an outstanding object of the invention to provide a fungicide which has increased activity for that purpose, which is easy to use, which has a minimum toxicity, and which is relatively inexpensive.

A further object of the present invention is the provision of a fungicidal mixture whose efficiency in protecting organic materials from attack by fungi is greater than by the use of any of its components separately at the dosages used.

With the foregoing and other objects in view, which will appear as the description proceeds, the invention resides in the combination and details of the mixture hereinafter described and claimed, it being understood that changes in the precise embodiment of the invention herein disclosed may be made within the scope of what is claimed without departing from the spirit of the invention.

In a general way, the present invention lies in the observation that mixtures of polychlorophenols having at least two chlorine atoms with certain organo-tin compounds are much more active against fungus growth, such as mushrooms, than either of the substances used separately.

The new fungicide made in accordance with the invention consists in a mixture of polychlorophenols having at least two atoms of chlorine with organo-tin compounds of the following type:

$$R,R',R''—Sn—OH$$

The derivatives of such organo-tin compounds, particularly halides or salts obtained by reaction with inorganic or organic acids, halogenated or not, as well as anhydrides, such as oxides, of trisubstituted tin are also useful in this connection.

In the above formula R,R',R'' represent identical or different residues of hydrocarbon radicals, saturated or not, such as alkyl, cycloalkyl, and aryl radicals.

As polychlorophenol constituents other than pentachlorophenol, use can also be made of dichlorophenols such as the derivative which is dichlorinated at the 2nd and 4th positions; trichlorophenols such as, for example, derivatives which are trichlorinated at the 2nd, 4th and 5th positions, at the 2nd, 4th, 6th positions and at the —2nd, 3rd, 6th positions; and tetrachlorophenols. Also, mixtures of these products may be used alone or with pentachlorophenol.

Among the organo-tin compounds which can be used in practising the invention are the following: oxides of trialkyl-tin ($R_3Sn—O—SnR_3$) in which the alkyl radical has preferably 2 to 8 carbon atoms, such as the oxides of triethyl-, tripropyl-, triisopropyl-, tributyl, triisobutyl-, tripentyl-, trihexyl-, triheptyl-, and trioctyl-tin; the monohalides of trialkyl-tin such as monochlorides, monobromides and monoiodides of the above trialkyl-tin groups, as well as sulphates or phosphates of these groups; oxides of tricycloalkyl- or triaryl-tins, particularly the oxides of tricyclopentyl-, tricyclohexyl-, triphenyl-, tritolyl-, triethylphenyl or trixylyl-tin, these being oxides of organic tin derivatives the cyclic radicals of which have 5 to 8 carbon atoms; and monohalides of these tricycloalkyl- and triaryl-tin groups, as well as their phosphates or sulfates.

The organo-tin compounds used may in a more general way be represented by the following formula:

$$R,R',R''—Sn—X$$

In this formula the radical X may consist of not only —OH, —Cl, —Br, —I, $\frac{1}{2}SO_4^{--}$, $\frac{1}{3}PO_4^{---}$ and other inorganic anionic groups, but also by a carboxylic group, such as acetyl-, chloroacetyl-, dichloroacetyl-, propionyl-, chloropropionyl-, dichloropropionyl-, butyryl-, chlorobutyryl-, dichlorobutyryl-, oxalyl-, tartaryl-, benzoyl-, phenoxy-, chloro- and polychlorophenoxy-, particularly pentachlorophenoxy-.

The composition of the mixture according to the invention may be varied with a plurality of factors such as the nature of the mushroom to be fought and of the material to be treated. The proportions leading to optimum results for the given mixture, are also variable according to the types of chemicals used in the mixture and may be easily determined by the man in the art.

Mixtures of this type containing between 51 and 99% of polychlorophenol (with respect to the total weight of the active composition) are particularly effective in combating a fungus growth and are, in any case, distinctively more active than each constituent taken alone. The activity which is a feature of each of the two constituents is very different; this was indicated particularly in tests with *Poria vaporaria* Pers. In these tests, in order to obtain the same fungicidal effect as that produced by 100 g. of the tin derivative in accordance with the invention, it is necessary to use 1,000 g. of polychlorophenol. This means that the inventive mixtures may contain small weights of the tin derivative together with a predominant weight of polychlorophenol. Thus, the majority of fungus growth may be destroyed by mixtures containing only 1 to 10% by weight of the tin derivative with an effectiveness considerably greater than when a polychlorophenol such as pentachlorophenol is used alone.

The mixtures according to the invention may be used alone or together with a carrier, a solvent, a diluent or any other conventional ingredient useful in the application of the fungicides. Thus, they may be used in the form of solutions in solvents such as alcohols, ketones, whitespirit or alkylaromatic hydrocarbons (especially mixtures of ethanol-acetone-xylene) or in the form of emulsions in an aqueous or non-aqueous liquid. Thus, the fungicidal composition generally contains about 0.01% to 20% by weight of the active mixture according to the invention, the balance being made up of one or more of the above ingredients.

The field of application of these new fungicides is very broad. For instance they may be used to protect various materials such as wood, textiles, plastic materials, paints and varnishes against the action of various types of fungus.

In order to illustrate the invention, there is described below its application to hte control of five different fungi. The tests described have been made according to the German standard D.I.N. 52,176 using mixtures containing 1,000 to 0 parts (by weight) of polychlorophenol with 0 to 100 parts (or 0 to 80 parts) of organo-tin compound. The materials used were samples of sapwood from Norway pine with dimensions of 3 x 1 x 0.5 cm. The samples were dried in an oven at 105° C., then weighed and impregnated with 0.025 to 1% solutions of the product to be studied dissolved in xylene. The contact with the fungus took place after four weeks of drying at 20° C. in an atmosphere having 60% humidity. Each test lasted 4 months at 25° C. with 85% relative humidity for Examples 1, 2, 4, 5, 6, 7 and 9; in Examples 3 and 8, i.e., for *Gyrophane lacrymans*, the test temperature was 20° C. and the relative humidity 85%.

Appreciable attack took place on the wood samples from the point of view of the covering of the samples by the fungus and the attack in depth. The fungus was stripped from the pieces of wood and they were dried at 105° C. and weighed. The difference between the initial and final weights of each wood sample gave the loss in weight which served to calculate the percentage efficiency of the product used, based on the loss in weight of a wood sample untreated by the fungicide.

The efficiency is determined by the ratio of the difference between the loss ($b$) in weight of the blank and the loss S in weight of the sample treated, to the loss in weight of the blank, according to the formula:

$$\frac{b-S}{b}$$

In the tables which follow, the percentages are indicated by weight. The figures given for the quantities of tin derivative and of polychlorophenol absorbed by the wood are mean values resulting from several tests made with a product of the same composition.

Several abbreviations have been used to simplify the reading of the tables: P.C.P. means' 'pentachlorophenol"; O.T.B.E. represents the "oxide of tributyl-tin"; ITPE indicates "triphenyl-tin iodide"; and AcTEE represents "triethyl-tin acetate."

Example 1.—Tests with *Poria vaporari* Pers

| OTBE percent in the mixture | OTBE absorbed, g./m.³ | PCP absorbed, g./m.³ | Covering | Attack in depth | Loss in weight | Efficiency, percent |
|---|---|---|---|---|---|---|
| 0 [1] | 0 | 0 | Serious and local | Very serious | 40.4 | 0 |
| 0 | 0 | 918 | Serious in places | Very serious and local | 33.8 | 16.3 |
| 1.1 | 10.80 | 974 | Average | Serious and local | 18.2 | 54.9 |
| 3.17 | 25.45 | 763 | Light | Light | 3.4 | 91.0 |
| 9.15 | 40.90 | 408 | ...do | ...do | 4.8 | 88.1 |
| 23 | 72.12 | 240 | ...do | ...do | 5.1 | 87.1 |
| 47.5 | 97.27 | 101 | Nil | Nil | 0.8 | 98.0 |
| 100 | 92.55 | 0 | Light | Very serious and local | 25.8 | 36.1 |

[1] Blank test (sample untreated by a fungicide).

Example 2.—Tests with *Lentinua squamosus* Schaeff

| OTBE percent in the mixture | OTBE absorbed, g./m.³ | PCP absorbed, g./m.³ | Covering | Attack in depth | Loss in weight | Efficiency, percent |
|---|---|---|---|---|---|---|
| 0 [1] | 0 | 0 | Very serious | Very serious | 56.1 | 0 |
| 0 | 0 | 714 | Very serious in places | Very serious locally | 35.8 | 36.1 |
| 1.08 | 9.13 | 821 | Average in places | Serious locally | 28.8 | 48.4 |
| 3.2 | 23.24 | 697 | ...do | ...do | 26.2 | 53.2 |
| 9.04 | 44.37 | 433 | ...do | Average locally | 24.1 | 57.0 |
| 23 | 64.18 | 213 | ...do | ...do | 22.2 | 60.4 |
| 45 | 88.84 | 109 | ...do | Light locally | 11.8 | 78.9 |
| 100 | 92.91 | 0 | Serious in places | Serious in total | 31.5 | 43.8 |

Example 3.—Tests with *Gyrophana lacrymans* Wulf-Pat.

| OTBE percent in the mixture | OTBE absorbed, g./m.³ | PCP absorbed, g./m.³ | Covering | Attack in depth | Loss in weight | Efficiency, percent |
|---|---|---|---|---|---|---|
| 0 [1] | 0 | 0 | Serious | Serious | 25.4 | 0 |
|  | 0 | 872 | Serious and total | Average and local | 18.9 | 25.5 |
|  | 10.29 | 928 | ...do | ...do | 14.0 | 44.8 |
|  | 24.51 | 735 | ...do | ...do | 12.7 | 50 |
| 9.15 | 49.79 | 497 | Average and total | ...do | 8.1 | 68.1 |
|  | 57.43 | 191 | ...do | ...do | 7.8 | 69 |
| 47.6 | 81.97 | 90 | Light and total | Light and local | 3.8 | 85 |
|  | 89.91 | 0 | Serious and total | Average and local | 4.5 | 82.2 |

Example 4.—Tests effected with *Coriolus versicolor* Pr. ex. Linne

| OTBE percent in the mixture | OTBE absorbed, g./m.³ | PCP absorbed, g./m.³ | Covering | Attack in depth | Loss in weight | Efficiency, percent |
|---|---|---|---|---|---|---|
| 0 [1] | 0 | 0 | Serious and local | Serious | 25.6 | 0 |
|  | 0 | 995 | ...do | Average and local | 21.6 | 15.6 |
|  | 10.90 | 981 | ...do | ...do | 20.1 | 21.4 |
|  | 23.53 | 705 | ...do | ...do | 15.5 | 39.4 |
| 23.2 | 62.62 | 208 | Average and local | Light and local | 12.7 | 50.3 |
|  | 80.50 | 89 | ...do | Average and local | 22 | 14.0 |
|  | 98.33 | 0 | Serious and local | Serious and local | 22.8 | 10.9 |

Example 5.—Tests with *Coniophora cerebella* Alb. et Schw.

| Percent OTBE in the mixture | OTBE absorbed, g./m.³ | PCP absorbed, g./m.³ | Covering | Attack in depth | Loss in weight | Efficiency, percent |
|---|---|---|---|---|---|---|
| 0 [1] | 0 | 0 | Serious | Serious | 36.5 | 0 |
|  | 0 | 720 | Serious and total | Average and total | 24.9 | 31.7 |
|  | 9.97 | 897 | Average and local | Serious and total | 30.5 | 16.4 |
| 33.5 | 24.89 | 746 | Light and local | Average and local | 21.3 | 41.6 |
|  | 43.66 | 436 | ___do___ | ___do___ | 26.7 | 26.8 |
|  | 66.30 | 220 | Average and total | Serious and total | 27.1 | 25.7 |
|  | 91.66 | 0 | Serious and toal | Serious and local | 27.1 | 25.7 |

Thus, it should be noted that excellent results are obtained with *Poria vaporaria* Pers with a product containing 3% of O.T.B.E., and the preserving of the wood is perfect with a mixture of 47.5% of O.T.B.E., 52.5% of PCP whose efficiency reaches 98%, while it is only of 16.3% with the PCP alone and 36.1% with the O.T.B.E. alone; this shows the highly pronounced synergistic effect between the two components.

The case of the *Lentinus equamosus* Schaeff (Example 2) shows an optimum for 45% of O.T.B.E. in the mixture, the quantity of PCP being only ⅓ of that which would be used alone, while that of O.T.B.E. is below the 92.9 g./m.³ used in the test without PCP; in this latter case, the efficiency is only 13.8% while it reaches 78.9% with the mixture according to the invention.

Example 6

Tests carried out with the fungus *Poria vaporaria* Pers. using mixtures of pentachlorophenol (PCP) and of iodide of triphenyl-tin (ITPE) in the respective proportions of 1,000 to 0 parts (by weight) of PCP for 0 to 100 parts of ITPE. The results are indicated in the table below:

| Percent ITPE in the mixture | ITPE absorbed g./m.³ | PCP absorbed, g./m.³ | Covering | Attack in depth | Loss in weight | Efficiency, percent |
|---|---|---|---|---|---|---|
| 0 [1] | 0 | 0 | Important | Very serious | 40.4 | 0 |
| 0 | 0 | 952 | ___do___ | ___do___ | 31.9 | 21.1 |
| 2.9 | 23 | 770 | Light | Light | 4.6 | 88.6 |
| 16.9 | 67 | 330 | ___do___ | ___do___ | 4.9 | 88.9 |
| 43 | 88.3 | 117 | Nil | Nil | 0.6 | 98.5 |
| 100 | 97 | 0 | Light | Serious and local. | 22.4 | 44.5 |

Example 7

The fungicidal tests were carried out with the mushroom *Coriolus versicolor* Fr. ex. Linne using mixtures of pentachlorophenol (PCP) and of triethyl-tin acetate (AcTEE) in the respective proportions of 1,000 to 0 parts (by weight) of PCP and 0 to 80 parts of ACTEE. The results are as follows:

| AcTEE absorbed, g./m.³ | PCP absorbed, g./m.³ | Covering | Attack in depth | Loss in weight | Efficiency, percent |
|---|---|---|---|---|---|
| 0 ([1]) | 0 | Serious and local | Serious and local | 25.6 | 0 |
| 0 | 990 | ___do___ | Average and local | 22.3 | 13.0 |
| 17.6 | 780 | ___do___ | ___do___ | 16.6 | 35.2 |
| 55.7 | 304 | Average | Light | 14.4 | 43.2 |
| 67.2 | 160 | ___do___ | Average | 19.3 | 24.6 |
| 79.7 | 0 | Serious and local | Serious and local | 24.0 | 6.25 |

Example 8

Operating as indicated in Examples 2 and 3 with the fungus *Lentinus equamosus* Schaeff and *Gyrophana Laervmans* Wulf-Pat but with mixtures of 1,000 to 0 parts of (by weight) pentachlorophenol and 0 to 100 parts of pentachlorophenate of triphenyltin, results were obtained which are substantially identical with those given by the combinations pentachlorophenol and tributyl-tin oxide.

Example 9

Operating as stated in Examples 1 and 5 of the main patent on the mushrooms *Poria vaporaria* Pers. and *Coniophora cerebella* Alb. et Schw. but using mixtures of 1,000 to 0 parts (by weight) of tetrachlorophenol and 0 to 100 parts of tributyl-tin acetate, results are obtained which are analogous to those given by the mixtures of pentachlorophenol and tributyl-tin oxide.

In all of the examples using the mixtures in accordance with the invention, efficiencies are obtained which are greater than those obtained with a polychlorophenol or an organo-tin compound of formula (R,R′,R″—Sn—OH) used alone; this is true for quantities of each of the components which are well below those in which the components are employed separately. The synergistic effect is, therefore, extremely clear and important.

While it will be apparent that the illustrated embodiments of the invention herein disclosed are well calculated to fulfill adequately the objects and advantages primarily stated, is to be understood that the invention is susceptible to variation, modification and change within the spirit and scope of the subjoined claims.

The invention having been thus described, what is claimed as new and desired to secure by Letters Patent is:

1. A fungicide comprising a mixture of 51 to 99 parts by weight of pentachlorophenol and 41 to 1 part by weight of a tin compound selected from the group consisting of tributyl-tin oxide, triphenyl-tin iodide and triethyl-tin acetate.

2. A fungicide composition comprising as the essential active ingredient a mixture as recited in claim 1 and an inert carrier.

3. The fungicide composition as recited in claim 2 which contains 0.012 to 20% by weight of the active ingredient.

4. The fungicide composition as recited in claim 1 wherein said tin compound is tributyl-tin oxide.

5. The fungicide composition as recited in claim 1 wherein said tin compound is triphenyl-tin iodide.

6. The fungicide composition as recited in claim 1 wherein said tin compound is triethyl-tin acetate.

References Cited

UNITED STATES PATENTS

| | | | |
|---|---|---|---|
| 2,071,822 | 2/1937 | Ellis | 167—31 X |
| 2,944,936 | 7/1960 | Bronson | 167—31 |
| 3,031,483 | 4/1962 | Koopmans | 167—22 X |
| 3,113,144 | 12/1963 | Zweigle | 260—429.7 |
| 3,210,245 | 10/1965 | Merten et al. | 167—31 X |
| 3,211,680 | 10/1965 | Updegraff et al. | 260—429.7 |
| 3,214,453 | 10/1965 | Stern | 260—429.7 |
| 3,257,194 | 6/1966 | Miller | 260—429.7 X |

ALBERT T. MEYERS, *Primary Examiner.*

D. R. MAHANAND, *Assistant Examiner.*